Feb. 14, 1928.

H. A. SANGREN 1,659,165

OPHTHALMIC MOUNTING

Filed Jan. 30, 1926

Inventor

Harry A. Sangren.

By Harry H. Styll
Attorney

Patented Feb. 14, 1928.

1,659,165

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed January 30, 1926. Serial No. 84,867.

This invention relates to ophthalmic mountings and has particular reference to an ophthalmic mounting made from a composition material in which the lenses are seated in a lens rim which is itself in turn seated in the frame of the mounting.

The principal object of this invention is to provide a lens holding rim that may be easily snapped into or out of a rim member of a composition ophthalmic frame.

Another object of the invention is to provide simple, efficient and inexpensive means for holding a lens in a composition opthalmic frame.

Another object of the invention is to provide a resilient lens holding member that may be snapped into or out of position in a composition ophthalmic frame, being held therein in use through the natural elasticity of the material from which the composition ophthalmic frame is made.

Other objects and advantages of the invention should become apparent from the following description taken in connection with the accompanying drawings, wherein only one form of the invention has been shown by way of illustration. It will be understood that I may make many changes in the arrangement of parts described as set forth in the claims without departing from the spirit of the invention. I, therefore, do not wish to be limited exactly to the details of construction and arrangement of parts shown and described.

Referring to the drawings, in which similar characters of reference are used to designate similar parts throughout:

Prior to my invention it has been customary to insert the lenses in the frames of composition material, such as celluloid, by heating the composition frame to stretch it, and putting the lens in place where it will be tightly gripped when the composition frame becomes cool through contraction. It has also been necessary to go through the same heating operation in removing the lenses. This heating of the frames is liable to warp and twist them out of shape and distort them so as to destroy their use on the face. This has been a great source of loss. Also the frames are liable to become warped and twisted when they contract on the lens if the lens is too large.

In my invention I have provided means for putting in and taking out lenses in frames of this character while the said frames are cold, thus obviating the necessity of heating the frames and running the chance of distorting them so that they cannot be used.

Figure 1:
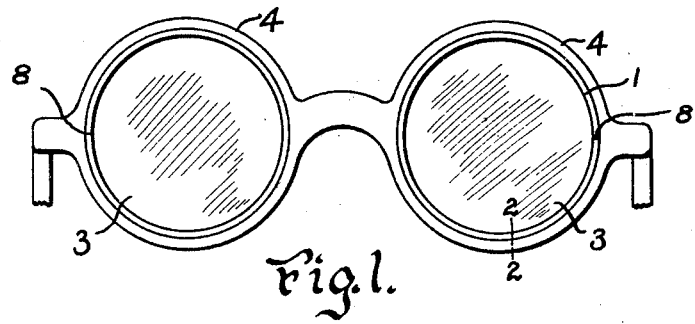
Figure 1 is a front view of an ophthalmic frame embodying the invention.
Figure 2:
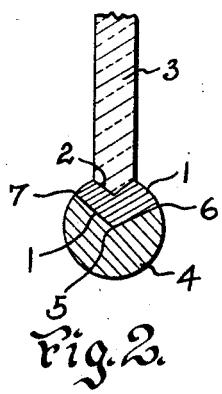
Figure 2 is a partial cross section on line 2—2 of Figure 1.
Figure 4:
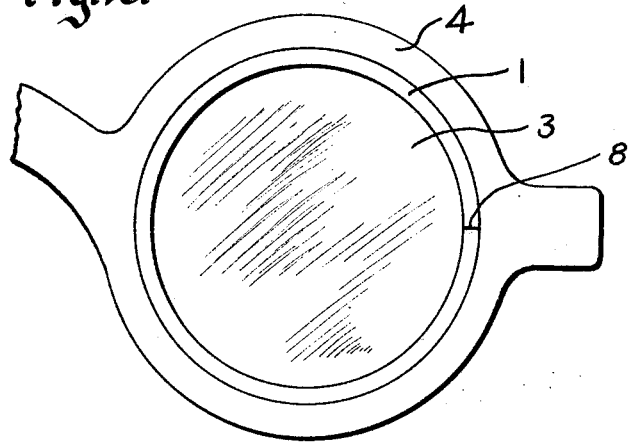
Figure 4 is a fragmentary portion of Figure 2 enlarged.

In one form of my invention as shown in Figure 2, I have provided a metallic lens rim 1 having a V-shaped lens groove 2 in which the lens 3 is inserted. The composition or celluloid frame 4 is grooved to fit the under side of the metallic rim 1, the point 5 of the groove being lower than the points 6 and 7. The metal rim 1 is split or divided at 8, Figures 1 and 4, so that the lens 3 may be inserted. After the lens 3 has been inserted in the rim 1, the rim 1 is snapped onto the composition rim 4 through the natural elasticity of the material of which the rim 4 is made. The lower face of the rim 1 acts as a wedge cam to force open the rim 4. After the point 5 of the rim 1 has passed the point 6 it slips naturally into the groove and the rim snaps back into place, thus locking the metallic rim with the lens therein. To remove the lens the operation is the same but in the reverse direction. The lower face of the rim 1 being wedge shaped it acts as a cam in both directions so to remove it it is only necessary to press on the lens in the opposite direction, force the rim open through its natural elasticity and take out the lens.

Figure 3:
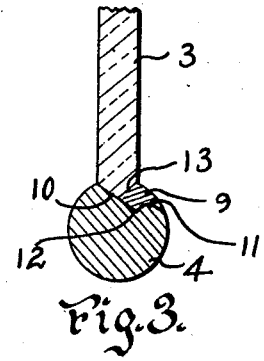
Figure 3 is a partial cross section similar to Figure 2, showing a modification.

In Figure 3, I have shown a modification in which no metallic rim 1 is used, but in place thereof I use a composition or celluloid rim 9 which I do not have to divide or split, as in the case of the metallic rim 1. In this type the composition rim 4 is provided with an inclined grooved face 10 and a locking shoulder 11; the point 12 being lower than the point 11 the angle of the face 10 fits the bevel of the lenses 3 on one side and the angle of the face 13 of the rim 9 fits the bevel of the lens 3 on the other side, the rim 9 being locked in the rim 4 by the shoulder 11. In this modification the lens is first placed in the rim 4 by seating it on the face 10 of the groove. The rim 9 is then sprung in place until the point 12 passes over the shoulder 11 thus locking the rim 9 in the rim 4. In this operation the natural elasticity of the rim 9 and the rim 4 aids in its operation. The rim 9 has the wedge cam faces as does the rim 1, and the lens may be removed exactly the same as the lens is removed in Figure 2, by pressing on the lens in the reverse direction, which brings the rim 9 out of place.

It will be seen that both the rims 1 and 9 will provide means by which the lens may be snapped into the composition frame 4 to hold it in place, and it may be snapped out of position when it is desired to remove the lens.

From the foregoing description it will be seen that I have provided simple, efficient and inexpensive means well suited for the objects and uses set forth above.

Having described my invention, I claim:

1. In a device of the character described, an elastic rim having an annular groove on its inside with inclined walls, the center of the groove being lower than the edges of the groove and one side of the groove being shaped to engage one side of a lens, and an annular rim whose outer periphery is shaped to fit in the groove of the elastic rim and whose inner portion is shaped to engage the other side of the lens, whereby the annular rim may be sprung into the elastic rim by pressure, the outer periphery acting as a cam face to spring the elastic rim, and whereby the annular rim may be pushed out of the elastic rim in the same manner in the opposite direction.

2. In a device of the character described, a rim having an annular groove on its inside with inclined walls, the center of the groove being lower than the edges of the groove, and one edge of the groove lower than the other and an elastic annular rim having a lens engaging face on its inside and its outer periphery shaped to fit the groove in the first rim, whereby the annular elastic rim may be sprung into the first rim by pressure, the outer periphery acting as a cam face to spring the elastic annular rim into the first rim, and whereby the elastic annular rim may be pushed out of the first rim in the same manner in the opposite direction.

3. In a device of the character described, an elastic rim having an annular groove on its inside with inclined walls, the center of the groove being lower than the edges of the groove and one edge of the groove lower than the other and an elastic annular rim having a lens engaging face on its inside and its outer periphery shaped to fit the groove in the first rim, whereby the elastic annular rim may be sprung into the first rim by pressure, the outer periphery acting as a cam face to spring the elastic rims, and whereby the elastic annular rim may be pushed out of the first rim in the same manner in the opposite direction.

HARRY A. SANGREN.